(12) United States Patent
Blair et al.

(10) Patent No.: US 7,704,560 B2
(45) Date of Patent: Apr. 27, 2010

(54) PROCESS FOR COATING FLUOROELASTOMER FUSER MEMBER USING BLEND OF DEFLOCCULANT MATERIAL AND FLUORINE-CONTAINING POLYSILOXANE ADDITIVE

(75) Inventors: Christopher D. Blair, Webster, NY (US); Ugur Sener, Webster, NY (US); Robert N. Finsterwalder, Webster, NY (US); Joy L. Longhenry, Webster, NY (US); Alan R. Kuntz, Webster, NY (US); Samuel Kaplan, Walworth, NY (US); Alexander N. Klymachyov, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 795 days.

(21) Appl. No.: 11/135,814

(22) Filed: May 23, 2005

(65) Prior Publication Data

US 2006/0263536 A1 Nov. 23, 2006

(51) Int. Cl.
*B05D 5/00* (2006.01)
(52) U.S. Cl. .................................................. 427/387
(58) Field of Classification Search .................. 427/387
See application file for complete search history.

(56) References Cited

U.S. PATENT DOCUMENTS

| | | | |
|---|---|---|---|
| 4,515,884 A | 5/1985 | Field et al. | |
| 4,968,766 A | 11/1990 | Kendziorski | |
| 5,463,009 A | 10/1995 | Okada et al. | |
| 5,568,239 A | 10/1996 | Furukawa et al. | |
| 5,624,780 A | 4/1997 | Nishimori et al. | |
| 5,627,000 A | 5/1997 | Yamazaki et al. | |
| 5,636,012 A | 6/1997 | Uneme et al. | |
| 5,641,603 A | 6/1997 | Yamazaki et al. | |
| 5,698,320 A | 12/1997 | Ebisu et al. | |
| 5,716,747 A | 2/1998 | Uneme et al. | |
| 5,736,250 A | 4/1998 | Heeks et al. | |
| 6,197,989 B1 | 3/2001 | Furukawa et al. | |
| 6,555,181 B1 * | 4/2003 | Santos et al. | 427/515 |
| 6,625,416 B1 * | 9/2003 | Badesha et al. | 399/308 |
| 7,485,344 B2 * | 2/2009 | Kaplan et al. | 427/385.5 |
| 2006/0269736 A1 | 11/2006 | Finn | |

* cited by examiner

*Primary Examiner*—Erma Cameron
(74) *Attorney, Agent, or Firm*—MH2 Technology Law Group

(57) ABSTRACT

A process for producing a fuser member coating including a) adding and reacting a fluoroelastomer, a crosslinking agent, a polar solvent, a fluorine-containing additive, and a deflocculant to form a coating solution, and b) providing the coating solution on the fuser member to form a fuser member coating, wherein the fluorine-containing additive includes pendant fluorinated groups.

19 Claims, 1 Drawing Sheet

PROCESS FOR COATING FLUOROELASTOMER FUSER MEMBER USING BLEND OF DEFLOCCULANT MATERIAL AND FLUORINE-CONTAINING POLYSILOXANE ADDITIVE

CROSS-REFERENCE TO RELATED APPLICATIONS

Reference is directed to copending, commonly-assigned 1) U.S. application Ser. No. 11/135,812, filed May 23, 2005, entitled, "Process for Coating Fluoroelastomer Fuser Member Using Fluorinated Polydimethylsiloxane Additive;" 2) U.S. application Ser. No. 11/135,823, filed May 23, 2005, entitled, "Process for Coating Fluoroelastomer Fuser Member Using Fluorinated Surfactant;" 3) U.S. application Ser. No. 11/136,171, filed May 23, 2005, entitled, "Process for Coating Fluoroelastomer Fuser Member Using Fluorinated Surfactant and Fluorinated Polydimethylsiloxane Additive Blend;" 4) U.S. application Ser. No. 11/136,166, filed May 23, 2005, entitled, "Process for Coating Fluoroelastomer Fuser Member Using Blend of Two Different Fluorinated Surfactants;" 5) U.S. application Ser. No. 11/135,586, filed May 23, 2005, entitled, "Fuser Member Comprising Deflocculated Material;" the subject matter of these applications is hereby incorporated by reference in their entirety.

BACKGROUND

The present disclosure relates, in various embodiments, to an imaging member or apparatus and fuser components thereof. In particular, the present disclosure relates to a fuser member that includes an outer coating layer comprising a polydimethylsiloxane and a deflocculating agent. A fuser member in accordance with the present disclosure is suitable for use in electrostatographic and xerographic printing processes and is described with particular reference thereto.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means such as, for example, a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is desired in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquify and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser member during the fusing operation. Typically, these materials are applied as thin films of, for example, silicone oils to prevent toner offset.

Another desired method for reducing offset is to impart antistatic and/or field assisted toner transfer properties to the fuser. To control the electrical conductivity of the release layer, however, the conformability and low surface energy properties of the release layer are often affected.

Known fuser coatings include high temperature polymers such as polytetrafluoroethylene, perfluoroalkoxy, fluorinated ethylene propylene, silicone rubber, fluorosilicone rubber, fluoroelastomers, and the like. These coatings have been found to have adequate release properties and control toner offset sufficiently. Problems, however, have resulted with known fuser member layers. For example, the fuser member may prematurely harden, which results in a life short fall. Some known fuser members have also been shown to exhibit a susceptibility to contamination, scratching and other damage. Further, silicone rubber layers tend to swell upon application of release agents. Moreover, fuser members have been shown to provide toner offset or inferior release capability, which allows for inappropriate copies and/or prints, and toner contamination to other parts of the machine.

U.S. Pat. No. 4,515,884 to Field et al. discloses a fuser member having a silicone elastomer-fusing surface, which is coated with a toner release agent, which includes an unblended polydimethyl siloxane.

U.S. Pat. No. 6,197,989 B1 to Furukawa et al. discloses a fluorine-containing organic silicone compound represented by a formula.

U.S. Pat. No. 5,736,250 teaches a crosslinked polysiloxane and fluoroelastomer layer.

U.S. Pat. No. 5,716,747 to Uneme et al. discloses a fluororesin coated fixing device with a coating of a fluorine containing silicone oil.

U.S. Pat. No. 5,698,320 to Ebisu et al. discloses a fixing device coated with a fluororesin, and having a fluorosilicone polymer release agent.

U.S. Pat. No. 5,641,603 to Yamazaki et al. discloses a fixing method using a silicone oil coated on the surface of a heat member.

U.S. Pat. No. 5,636,012 to Uneme et al. discloses a fixing device having a fluororesin layer surface, and using a fluorine-containing silicone oil as a repellant oil.

U.S. Pat. No. 5,627,000 to Yamazaki et al. discloses a fixing method having a silicone oil coated on the surface of the heat member, wherein the silicone oil is a fluorine-containing silicone oil and has a specific formula.

U.S. Pat. No. 5,624,780 to Nishimori et al. discloses a fixing member having a fluorine-containing silicone oil coated thereon, wherein the silicone oil has a specific formula.

U.S. Pat. No. 5,568,239 to Furukawa et al. discloses a stain proofing oil for heat fixing, wherein the fluorine-containing oil has a specific formula.

U.S. Pat. No. 5,463,009 to Okada et al. discloses a fluorine-modified silicone compound having a specific formula, wherein the compound can be used for oil-repellency in cosmetics.

U.S. Pat. No. 4,968,766 to Kendziorski discloses a fluorosilicone polymer for coating compositions for longer life.

One of the problems associated with fuser members coated with, for example, a fluoroelastomer, is that such coatings have a failure mode where the prints develop noticeable gloss variation as the coating wears. While even the worn areas of a fuser members often yield absolute gloss that is within the specification or tolerance limits of an imaging apparatus, a variation of as little as 2 gloss units is detectable by the human eye and may be deemed a failure or unacceptable result.

Another problem associated with fuser members coated with a fluoroelastomer is a defect known as barium sulfate defect. Barium sulfate is often added to and present on the surface of a fluoroelastomer polymer material to keep individual polymer pellets or particles from agglomerating. Barium sulfate, however, is otherwise not a necessary component to the functioning of the coating material. Barium sulfate defect results from agglomeration of insoluble barium sulfate present in the coating. Moreover, fuser member outer-layers produced by the flow coat process exhibit additional defects that occur particularly when the coatings are very thin, for example less than 50 micrometers in thickness. These defects include "snowflake agglomerates," which are due to agglomeration of particles such as barium sulfate added to certain fluoroelastomers to prevent the fluoroelastomer pellets from sticking together, and "fisheyes," which are typically 1 to 5 millimeter regions either devoid of a fluoroelastomer layer, or with a very thin fluoroelastomer layer. Such defects in the fuser member outer-layer can cause undesirable image defects on the printed copy, such as toner spots, toner picking (i.e., removal of toner leaving white spots), non-uniform gloss, hot offset, and poor image permanence. There exists a need for a flow coating solution that forms a fuser member outer-layer surface that is smooth and free of such defects.

Therefore, a need remains for fuser components for use in electrostatographic machines that have superior mechanical properties. Further, a need remains for fuser coatings having reduced susceptibility to contamination, scratching, and other damage. There is also a need for a coating layer that exhibits a relatively low roughness and is suitable for a fuser member. In addition, a need remains for a fuser component having a longer life. Even further, a need remains for a fuser component that maintains a high gloss.

SUMMARY

Embodiments include a process for producing a fuser member coating comprising a) adding and reacting a fluoroelastomer, a crosslinking agent, a polar solvent, a fluorinated polydimethylsiloxane additive, and a deflocculant to form a coating solution, and b) providing said coating solution on said fuser member to form a fuser member coating, wherein said fluorinated polydimethylsiloxane additive comprises pendant fluorinated groups.

Embodiments further include a process for producing a fuser member coating comprising a) adding and reacting a fluoroelastomer, a crosslinking agent, a polar solvent, a fluorinated polydimethylsiloxane additive, and a deflocculant to form a coating solution, and b) providing said coating solution on said fuser member to form a fuser member coating, wherein said fluorinated polydimethylsiloxane additive has the following Formula I:

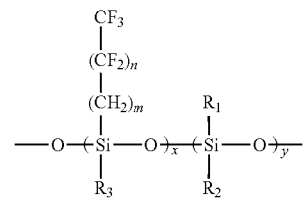

wherein m and n represent the number of repeating units and are the same or different, and wherein m is a number of from about 0 to about 25; n is a number of from about 1 to about 25; x/(x+y) is from about 1 percent to about 100 percent; $R_1$ and $R_2$ can be the same or different and are selected from the group consisting of alkyl having from about 1 to about 18 carbon atoms, arylalkyl groups having from about 1 to about 18 carbons, amino groups, and alkylamino groups having from about 1 to about 18 carbons; and $R_3$ is selected from the group consisting of alkyl having from about 1 to about 18 carbons, arylalkyl having from about 1 to about 18 carbons, a polyorganosiloxane chain having from about 1 to about 300 repeat units, and a fluoro-chain of the formula $—(CH_2)_o—(CF_2)_p—CF_3$ where o and p represent the number of repeating units and are the same or different, and wherein o is a number of from about 0 to about 25, and p is a number of from about 0 to about 25.

In addition, embodiments include a process for producing a fuser member coating comprising a) adding and reacting a fluoroelastomer, a crosslinking agent, a polar solvent, a fluorinated polydimethylsiloxane additive, and a deflocculant to form a coating solution, and b) providing said coating solution on said fuser member to form a fuser member coating, wherein said fluorinated polydimethylsiloxane additive comprises pendant fluorinated groups, and further wherein said fluoroelastomer is selected from the group consisting of a) copolymers of two of vinylidene fluoride, hexafluoropropylene and tetrafluoroethylene, b) terpolymers of vinylidene fluoride, hexafluoropropylene, and tetrafluoroethylene, and c) tetrapolymers of vinylidene fluoride, hexafluoropropylene, tetrafluoroethylene, and a cure site monomer.

Moreover, embodiments include a process for producing a fuser member coating comprising a) adding and reacting a fluoroelastomer, a crosslinking agent, a polar solvent, a fluorinated polydimethylsiloxane additive, and a deflocculant in order to form a coating solution, wherein said fluorinated polydimethylsiloxane additive comprises pendant fluorinated groups, and wherein said deflocculant comprises a material selected from the group consisting of sodium carbonate, sodium silicate, sodium borate, tetrasodium pyrophosphate, polyisobutylene, polyvinyl butyral, polyethylene glycol, glycerol tristerate, corn oil, linseed oil, stearic acid, lanolin fatty acids, certain fish oils, dibutyl amine, polycaprolactone, aromatic polyisocyanurate, tolyl diisocyanate, copolymers thereof, and combinations thereof; and b) providing said coating solution on said fuser member to form a fuser member coating.

BRIEF DESCRIPTION OF THE DRAWINGS

For a better understanding of the present invention, reference may be had to the accompanying figures.

DETAILED DESCRIPTION

The present disclosure concerns an imaging member or apparatus and fuser components thereof for use in electrostatographic, including digital, contact electrostatic printing, and like apparatuses. The fuser components include a fuser member for fixing a developed image on a copy substrate. The fuser member comprises a substrate and, thereover, an outer layer comprising a polydimethylsiloxane additive and a deflocculating agent.

Figure 1:
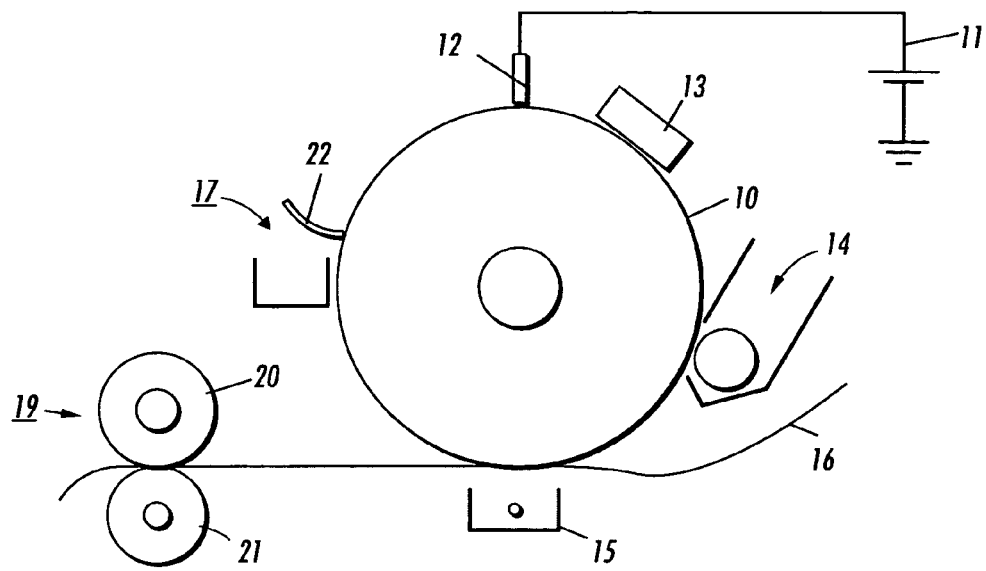
FIG. 1 is a schematic illustration of an image apparatus in accordance with an embodiment.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
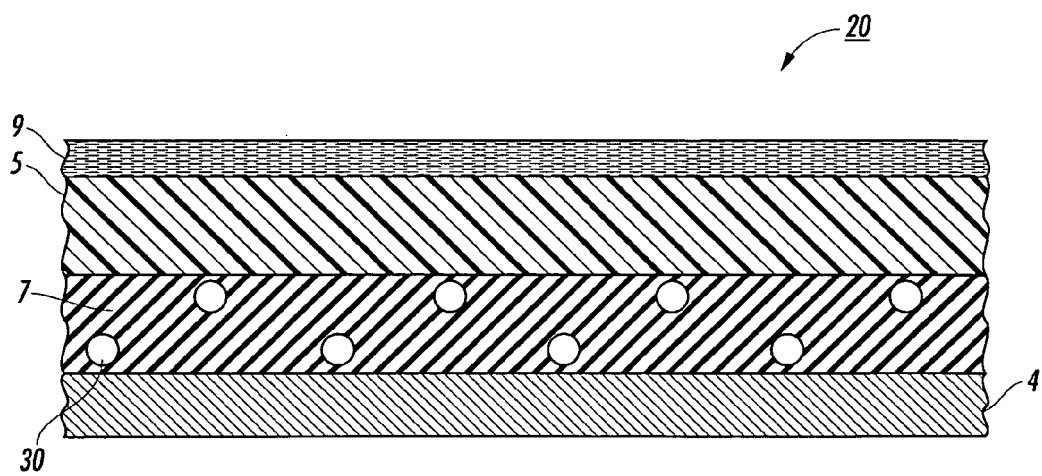
FIG. 2 is an enlarged, side view of an embodiment of a fuser member, showing a fuser member with a substrate, intermediate layer, outer layer, and release agent coating layer.

FIG. 2 is an enlarged schematic view of an embodiment of a fuser member, demonstrating the various possible layers. As shown in FIG. 2, substrate 4 has intermediate layer 7 thereon. Intermediate layer 7 can be, for example, a rubber such as silicone rubber or other suitable rubber material. As shown in FIG. 2, intermediate layer 7 can have fillers 30 dispersed or contained therein. The substrate and/or outer layer can also have fillers dispersed or contained therein (fillers not shown). The optional fillers for the three layers can be the same or different. On intermediate layer 7 is positioned outer layer 5 comprising a fluoroelastomer as described below. Positioned on outer fluoroelastomer layer 5 is outermost liquid release layer 9.

The fuser member can be in the form of a roller, sheet, belt, film, drelt (hybrid between a drum and a belt), or the like. In embodiments, the fuser member is in the form of a cylindrical roller, wherein the roller substrate has a metal core, such as aluminum, steel, stainless steel, or the like metal substrate.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A, VITON B, VITON E, VITON E 60C, VITON E430, VITON 910, VITON GH; VITON GF; and VITON ETP The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170, FLUOREL 2174, FLUOREL 2176, FLUOREL 2177 and FLUOREL LVS 76, FLUOREL® being a Trademark of 3M Company. Additional commercially available materials include AFLAS® a poly(propylene-tetrafluorbethylene) and FLUOREL II (LII900) a poly(propylene-tetrafluoroethylenevinylidenefluoride) both also available from 3M Company, as well as the TECNOFLON® identified as FOR-60KIR, FOR-LHF, NM FOR-THF, FOR-TFS, TH, NH, P757, TNS, T439, PL958, BR9151 and TN505, available from Ausimont.

Examples of three known fluoroelastomers are (1) a class of copolymers of two of vinylidenefluoride, hexafluoropropylene, and tetrafluoroethylene, such as those known commercially as VITON A; (2) a class of terpolymers of vinylidenefluoride, hexafluoropropylene, and tetrafluoroethylene known commercially as VITON B; and (3) a class of tetra polymers of vinylidenefluoride, hexafluoropropylene, tetrafluoroethylene, and cure site monomer known commercially as VITON GH or VITON GF.

The fluoroelastomers VITON GH and VITON GF have relatively low amounts of vinylidenefluoride. The VITON GF and VITON GH have about 35 weight percent of vinylidenefluoride, about 34 weight percent of hexafluoropropylene, and about 29 weight percent of tetrafluoroethylene with about 2 weight percent cure site monomer.

The thickness of the outer layer of the fuser member is from about 10 to about 500 micrometers, or from about 10 to about 40 micrometers.

The amount of fluoroelastomer compound in solution in the outer layer solution is from about 5 to about 40 percent, or from about 16 to about 22 percent by weight of total solids. Total solids as used herein include the amount of fluoroelastomer, crosslinking agent, solvent, surfactant, dehydrofluorinating agent, surfactant, and optional adjuvants and fillers, including optional metal oxide fillers.

An inorganic particulate filler may be used in connection with the fluoroelastomer outer layer, in order to provide anchoring sites for the functional groups of the silicone fuser agent. Examples of suitable fillers include a metal-containing filler, such as a metal, metal alloy, metal oxide, metal salt or other metal compound. The general classes of metals, which are applicable herein, include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina respectively. The filler may be included in the substrate, and/or intermediate layer, and/or outer layer. The optional filler in the various layers may be the same or different.

Optional intermediate adhesive layers and/or intermediate polymer or elastomer layers may be applied to achieve desired properties and performance objectives of the present invention. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC 735 black RTV and SILASTIC 732 RTV, both from Dow Corning; and 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC 590 LSR, SILASTIC 591 LSR, SILASTIC 595 LSR, SILASTIC 596 LSR, and SILASTIC 598 LSR from Dow Corning.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 10 mm.

Suitable release agents or fusing oils can be provided onto the outer layer of the fuser member via a delivery mechanism such as a delivery roll. The delivery roll is partially immersed in a sump, which houses the fuser oil or release agent. The oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

The fluoroelastomer fuser coating can be prepared by adding a surfactant and/or additive to the fluoroelastomer coating solution, prior to coating of the fluoroelastomer in solution on the fuser member. The details of the process are as follows.

In embodiments, coating solutions comprise a polymer and a fluorine-containing material. More specifically, the coating can comprise a polymer such as a fluoropolymer, a curative system appropriate for the particular polymer, and additional additives to assist with curing and to improve mechanical and thermal properties of the coated layer. The coating solution can also comprise a fluorine-containing material such as a fluorine-containing polysiloxane, or a fluorine-containing surfactant that is not a polysiloxane, or a blend of a fluorine-containing polysiloxane and a fluorine-containing surfactant, or a blend of at least two distinguishing fluorine-containing surfactants to provide coatings that are free of or have a reduced numbers of defects. Optionally, additives may be used to increase pot-life to an acceptable time. All of these components are added to a solvent in order to form a solution/dispersion, which is applied to the fuser roll by the flow coating or other coating method.

Examples of suitable fluorine-containing polysiloxane additives include polysiloxanes with pendant fluorinated groups, such as $CF_3(CF_2)_n(CH_2)_m$—. In embodiments, the polysiloxanes having pendant fluorinated groups include those having the following Formula I:

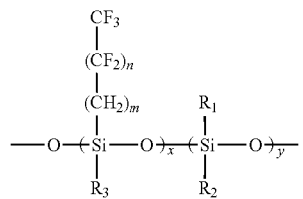

wherein m and n represent the number of repeating units and are the same or different, and m is from about 0 to about 25 or from about 1 to about 10, or from about 1 to about 5, or about 2; and n is from about 1 to about 25, or from about 2 to about 12, or from about 3 to about 7, or about 5. The extent of incorporation of the pendant fluorocarbon chains, defined as $x/(x+y)$ is from about 1 percent to about 100 percent, from about 4 percent to about 20 percent, from about 5 percent to about 10 percent, or about 5.7 percent. The groups, $R_1$ and $R_2$ can be the same or different and are selected from the group consisting of alkyl having from about 1 to about 18 carbon atoms, such as methyl, ethyl, propyl, butyl and the like; arylalkyl groups having from about 1 to about 18 carbons, such as methylphenyl, ethylphenyl, propylphenyl, butylphenyl and the like; amino groups; and alkylamino groups having from about 1 to about 18 carbons, such as methylamino, ethylamino, propylamino, butylamino and the like. The group $R_3$ is selected from the group consisting of alkyl and arylalkyl groups such as those just listed, a polyorganosiloxane chain having from about 1 to about 300 repeat units, and a fluorochain of the formula —$(CH_2)_o$—$(CF_2)_p$—$CF_3$ where o and p have the same ranges as m and n, respectively, but may be the same or different than m and n.

A specific example of a fluorine-containing polysiloxane additive is one having the following Formula II:

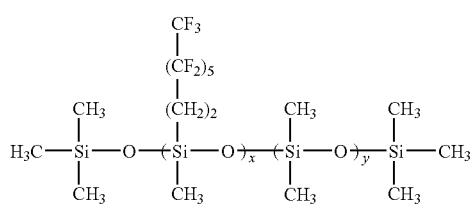

wherein in Formula II, x/(x+y) is about 5.7%.

In embodiments, the viscosity of the polydimethylsiloxane additive is from about 50 to about 2000 cS, or from about 100 to about 500 cS, or about 220 cS.

The deflocculating agent includes any material known to act as a deflocculant. The deflocculating agent is capable of at least one of 1) decreasing the viscosity of the coating composition, and/or 2) preventing flocculation of particles in the coating composition. In embodiments, the deflocculating agent reduces flocculation or agglomeration of a substantial portion of any insoluble barium sulfate particles present in the coating composition and reduces the barium sulfate defect. In other embodiments, the deflocculating agent prevents flocculation or agglomeration of any insoluble barium sulfate particles present in the coating composition and eliminates the barium sulfate defect.

An example of a suitable deflocculating agent includes Disperbyk polymer compositions available from BYK Chemie. A non-limiting example of a suitable Disperbyk polymer is Disperbyk-167™ The polymer is a copolymer of polycaprolactone and aromatic polyisocyanurate based on tolyl diisocyanate (TDI). It is in solvents of methoxypropylacetate and butyl acetate. The product literature claims that BYK-167 acts via stearic stabilization, only and does not posses an ionic component.

Other suitable deflocculating agents exist. Most are used in water-based systems, however some are designed for solvent-based systems (such as MIBK). Polymethacrylic acid (PMA) is a very common water-based deflocculant used in the ceramics industry. Its molecular weight is chosen depending on the size of particles in suspension. Typically, a weight between 1,000 and 50,000 is chosen. Often a Na+ ion is attached to the PMA to provide for further deflocculation by electrostatic repulsion. This is commonly known as electrosteric stabilization because it uses both electrostatics and the steric hinderance provided by the polymer chain. Other common deflocculants used in water include, but are not limited to sodium carbonate, sodium silicate, sodium borate, tetrasodium pyrophosphate, and other sodium-based materials.

Other Deflocculating agents (which may or may not be used in water) include, but are not limited to polyisobutylene, polyvinyl butyral, polyethylene glycol, glycerol tristearate, corn oil, linseed oil, stearic acid, lanolin fatty acids, certain fish oils, dibutyl amine and many others.

The amount of deflocculating agent is based on the specific surface area of the particles to be defloculated. This specific surface area is determined by the particles shape and size and can be determined via an analytic technique known as BET Nitrogen Absorption.

The outer layer composition may optionally comprise a surfactant. In one embodiment, the outer layer comprises a surfactant. Examples of materials suitable for use as a surfactant in an outer layer include, but are not limited to, fluorine-containing surfactants such as FC430, by 3M Corporation. In another embodiment, the outer layer is substantially free of a surfactant. The benefits achieved by employing a deflocculating agent in the outer layer are not adversely affected by the presence or absence of a surfactant. The use of a deflocculating agent enables the outer layer to be formed without the need for any additional surfactant.

The coating compositions comprising the polydimethylsiloxane additive and deflocculating agent may be prepared by any suitable method including, for example, mixing of the fluoroelastomer and the deflocculating agent.

In embodiments, the thickness of the outer layer is from about 5 to about 250 microns, or from about 15 to about 150 microns, or from about 20 to about 25 microns.

In an optional embodiment, an intermediate layer may be positioned between the imaging substrate and the outer layer. Materials suitable for use in the intermediate layer include silicone materials, elastomers such as fluoroelastomers, fluorosilicones, ethylene propylene diene rubbers, silicone rubbers such as fluorosilicones, phenyl silicones, silicone blends, and the like. Additional polymers useful as the outer release layer include fluoropolymers such as polytetrafluoroethylene (PTFE), fluorinated ethylenepropylene copolymer (FEP), polyfluoroalkoxy polytetrafluoroethylene (PFA Teflon), ethylene chlorotrifluoro ethylene (ECTFE), ethylene tetrafluoroethylene (ETFE), polytetrafluoroethylene perfluoromethylvinylether copolymer (MFA), and the like. These polymers, together with adhesives, can also be included as intermediate layers and the like, and mixtures thereof. In embodiments, the intermediate layer is conformable and is of a thickness of from about 2 to about 60 mils, or from about 4 to about 25 mils.

Examples of suitable adhesives include silanes such as amino silanes (such as, for example, A1100 from OSI Specialties, Friendly West Virginia), titanates, zirconates, aluminates, and the like, and mixtures thereof. In an embodiment, an adhesive in from about 0.25 to about 10 percent solution can be wiped on the substrate. The adhesive layer can be coated on the substrate or on the intermediate layer, to a thickness of from about 2 to about 2,000 nanometers, or from about 2 to about 500 nanometers. The adhesive can be coated by any suitable, known technique, including spray coating or wiping.

In embodiments, the fuser member coating formulation solution comprises a blend of a fluorine-containing polysiloxane of Formula I or II, in combination with a deflocculant.

In embodiments, the blend of fluorine-containing polysiloxane and deflocculant is added to the fluoroelastomer coating solution in an amount of from about 0.5 to about 20 pph, or from about 3 to about 10 pph, wherein pph is expressed with respect to the weight of fluoroelastomer in the coating solution. In embodiments, the blend of fluorine-containing polysiloxane and deflocculant contains about 0 to about 100, or from about 1 to about 50, or from about 30 to about 40 percent polysiloxane.

Addition of a blend of fluorine-containing polysiloxane and deflocculant results in formation of an outer fluoroelastomer fuser member layer which, in embodiments, functions well in fusing toner to a copy substrate. The fuser member coating, in embodiments, is smooth, and has few, if any, defects. In embodiments, the number of fisheyes and snowflake agglomerates are reduced or eliminated. Also, there is no deterioration in hot offset or stripping performance and no deterioration in image quality in embodiments.

In embodiments, the fluoroelastomer coating is applied to the fuser member substrate using the flow coating process, although other processes such as dip coating and spray coating may be employed. In general, flow coating involves the deposition of a coating solution onto the substrate by rotating the substrate about its longitudinal axis and applying the coating from an applicator to the substrate in a spiral pattern in a controlled amount so that substantially all the coating that exits the applicator adheres to said substrate. The details of the flow coating procedure can be found in U.S. Pat. Nos.

5,945,223, 6,408,753, 6,521,330 and in U.S. Pat. No. 6,479,158, the disclosures of which are hereby incorporated by reference in their entirety.

In embodiments, the viscosity of the polydimethylsiloxane additive is from about 75 to about 1,500 cS, or from about 200 to about 1,000 cS, or about 220 cS.

The following examples are for purposes of further illustrating fuser components in accordance with the present disclosure. The examples are merely illustrative and are not intended to limit fuser components in accordance with the disclosure to the materials, conditions, or process parameters set forth therein. All parts are percentages by weight unless otherwise indicated.

EXAMPLES

Example 1

Formation of Fuser Member Coating

A fuser member topcoat formulation was prepared from a solvent solution/dispersion containing 100 parts by weight of a hydrofluoroelastomer, DuPont Viton® GF, a polymer of 35 weight percent vinylidenefluoride, 34 weight percent hexafluoropropylene and 29 weight percent tetrafluoroethylene and 2 weight percent of a cure site monomer. The Viton® GF is mixed with 7 parts by weight of DuPont Viton® Curative 50, 1.5 parts by weight magnesium oxide (Maglite D available from C. P. Hall, Chicago, Ill.), 0.75 parts by weight calcium hydroxide, 0.75 parts by weight carbon black (N990 available from R. T. Vanderbilt Co.), 5.6 parts by weight Novec™ FC-430 (available from 3M) in a mixture of methylethylketone and methylisobutyl ketone, which was dispensed onto the fuser member surface using the flow coat method to a nominal thickness of about 20 micrometers. The coating was cured by stepwise heating in air at 95° C. for 2 hours, 175° C. for 2 hours, 205° C. for 2 hours, and 230° C. for 16 hours.

Flow Coating is described as dripping material spirally over a horizontally rotating cylinder. Generally, in this flow coating method, the coating is applied to the substrate by rotating the substrate in a horizontal position about a longitudinal axis and applying the coating from an applicator to the substrate in a spiral pattern in a controlled amount so that substantially all the coating that exits the applicator adheres to the substrate. For specific details of an embodiment of the flow coating method, attention is directed to U.S. Pat. No. 5,945,223, entitled "Flow Coating Solution and Fuser Member Layers Prepared Therewith" and to U.S. Pat. No. 6,408,753 and U.S. Pat. No. 6,521,330, entitled "Flow Coating Process for Manufacture of Polymeric Printer and Belt Components," and to U.S. Pat. No. 6,479,158, entitled "Fuser Member with an Amino Silane Adhesive Layer and Preparation Thereof," the disclosures of which is hereby incorporated by reference in its entirety. For specific details of an embodiment of fuser member top coat compositions, attention is directed to U.S. Pat. No. 5,332,641, entitled "Fuser Member with an Amino Silane Adhesive Layer," the disclosures of which is hereby incorporated by reference in its entirety.

Example II

Formation of Fuser Member Coating Comprising Deflocculant

The control coating is described above. One trial material was made identically as the material in Example I, except that in place of Novec FC-430, 3.3 parts per hundred of BYK 167 was used. This yielded a final dried coating with the following approximate composition with respect to the total amount of Viton GF™ by weight: 3.3 parts per hundred (pph) BYK 167, 1.5 pph Magnesium 170 special, 0.75 pph Calcium Hydroxide, 0.75 pph Carbon Black N990 and 7 pph Viton Curative 50. The remainder of the coating is occupied by a solvent such as MEK or MIBK or a mixture thereof. This solvent is volatile and not present in an appreciable amount in the final dried and cured coatings.

Four rolls were coated using the above-described coating composition comprising a deflocculating agent. Additionally, eight control fuser members (C1-C8) were prepared with control coating compositions as described in Example I.

Adhesion testing was conducted on the fusers that employed the outer coating composition comprising the deflocculating agent. Adhesion was tested by 90-degree peel test using an Instron test in pull mode. A strip is adhered to the surface of the roll and pulled via Instron to determine the stress required to peel the Viton coating away from the silicone layer. Pull force resulted in an average of 1.2 pounds/inch, which is below the required minimum pull force of 1.4 pounds/inch.

In further testing using 4.0 pph BYK 167, it was found the adhesion increased to 2.0-2.5 lbs/in. This is on the order of control formulations and is an acceptable level for roll performance.

Gloss and roughness of both the experimental and control fuser members were also evaluated. The results of these tests are shown in Tables 1 and 2.

TABLE 1

| Deflocculated Roll | Average Gloss GGU | Ra um | Rmax um | Rz um | Wt um |
|---|---|---|---|---|---|
| 4 | 92.925 | 0.27 | 8.31 | 3.61 | 6.08 |
| 3 | 93.425 | 0.20 | 3.36 | 3.36 | 5.60 |
| 2 | 93.025 | 0.22 | 1.79 | 1.79 | 5.23 |
| 1 | 92.950 | 0.20 | 2.09 | 2.09 | 3.73 |
| Average | 93.081 | 0.223 | 3.888 | 2.713 | 5.160 |
| Standard Deviation | 0.233 | 0.033 | 3.026 | 0.906 | 1.015 |

TABLE 2

| Control Roll | Average Gloss GGU | Ra um | Rmax um | Rz um | Wt um |
|---|---|---|---|---|---|
| 1 | 86.450 | 0.22 | 7.91 | 6.31 | 5.36 |
| 2 | 86.325 | 0.22 | 8.29 | 4.47 | 4.11 |
| 3 | 85.850 | 0.24 | 8.29 | 5.89 | 3.46 |
| 4 | 86.100 | 0.29 | 11.52 | 8.65 | 4.22 |
| 5 | 83.800 | 0.29 | 13.06 | 9.33 | 5.48 |
| 6 | 85.900 | 0.28 | 11.14 | 9.04 | 4.12 |
| 7 | 86.200 | 0.26 | 8.18 | 6.47 | 4.89 |
| 8 | 85.650 | 0.26 | 8.44 | 6.58 | 5.11 |
| Average | 85.784 | 0.258 | 9.604 | 7.093 | 4.594 |
| Standard Deviation | 0.844 | 0.029 | 1.989 | 1.724 | 0.718 |

Tables 1 and 2 show that the fusers comprising a deflocculating agent in the outer layer composition exhibited a decrease in the roughness and improved gloss. In this particular experiment the average gloss of fusers comprising the deflocculating agent in the outer layer was about 8 gloss units higher than the average for the control fusers. As previously mentioned, a variation in as little as 2 gloss units is detectable to the human eye. Additionally, the fuser members comprising the deflocculating agent showed no signs of barium sul-

Example III

Fuser Member Coating Comprising Deflocculant and Fluorine-Containing Polydimethylsiloxane Additive A fuser member coating formulation was prepared identically to Example I except that in place of the Novec FC-430, 2.0 parts per hundred of BYK 167 and 1.0 parts per hundred fluorinated silicone described by Formula II above were used. This yielded a final dried coating with the following approximate composition with respect to the total amount of VITON® GF by weight: 2.0 parts per hundred (pph) BYK 167, 1.0 pph fluorinated silicone as described by Formula II, 1.5 pph Magnesium 170 special, 0.75 pph Calcium Hydroxide, 0.75 pph Carbon Black N990 and 7 pph VITON® Curative 50. The remainder of the coating is occupied by a solvent such as MEK or MIBK or a mixture thereof. This solvent is volatile and not present in an appreciable amount in the final dried and cured coatings.

Coatings comprising of the blend of BYK167 and fluorinated silicone have similar adhesion and gloss performance to that of the coating of Example II whose performance is listed in Tables 1 and 2. In addition, this coating is free of visual defects (barium sulfate snowflake defects, fisheyes, solvent popping, etc.). The advantage of Example III over Example II is superior fuser offset performance. Offset testing was performed which indicated equivalent offset life of the coating of Example III with that of Example I, which provides benchmark fuser offset life.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for producing a fuser member coating comprising:
   a) adding and reacting a fluoroelastomer, a crosslinking agent, a polar solvent, and a fluorine-containing polysiloxane additive, and a deflocculant to form a coating solution, and
   b) providing said coating solution on said fuser member to form a fuser member coating, wherein said fluorine-containing polysiloxane additive comprises pendant fluorinated groups and has the following Formula I:

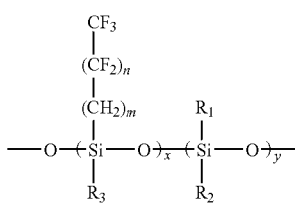

wherein m and n represent the number of repeating units and are the same or different, and wherein m is a number of from about 0 to about 25; n is a number of from about 1 to about 25; x/(x+y) is from about 1 percent to about 100 percent; $R_1$ and $R_2$ can be the same or different and are selected from the group consisting of alkyl having from about 1 to about 18 carbon atoms, arylalkyl groups having from about 1 to about 18 carbons, amino groups, and alkylamino groups having from about 1 to about 18 carbons; and $R_3$ is selected from the group consisting of alkyl having from about 1 to about 18 carbons, arylalkyl having from about 1 to about 18 carbons, a polyorganosiloxane chain having from about 1 to about 300 repeat units, and a fluoro-chain of the formula —$(CH_2)_o$—$(CF_2)_p$—$CF_3$ wherein o and p represent the number of repeating units and are the same or different, and wherein o is a number of from about 0 to about 25, and p is a number of from about 0 to about 25.

2. The process according to claim 1, wherein the deflocculant comprises a material selected from the group consisting of sodium carbonate, sodium silicate, sodium borate) tetrasodium pyrophosphate, polyisobutylene, polyvinyl butyral, polyethylene glycol, glycerol tristearate, corn oil, linseed oil, stearic acid, lanolin fatty acids, fish oils, dibutyl amine, polycaprolactone, aromatic polyisocyanurate, tolyl diisocyanate, polymethacrylic acid, copolymer of polycaprolactone and aromatic polyisocyanurate, and mixtures thereof.

3. A process in accordance with claim 2, wherein said deflocculant comprises a copolymer of polycaprolactone and aromatic polyisocyanurate.

4. A process in accordance with claim 1, wherein said pendant fluorinated groups have the following formula $CF_3(CF_2)_n(CH_2)_m$—, wherein n is a number of from about 1 to about 25 and m is a number of from about 0 to about 25.

5. A process in accordance with claim 1, wherein n is a number of from about 1 to about 10.

6. A process in accordance with claim 1, wherein n is a number of from about 2 to about 12.

7. A process in accordance with claim 1, wherein x/(x+y) is from about 4 to about 20 percent.

8. A process in accordance with claim 7, wherein x/(x+y) is about 5.7 percent.

9. A process in accordance with claim 1, wherein o is a number of from about 1 to about 10.

10. A process in accordance with claim 1, wherein p is a number of from about 2 to about 12.

11. A process in accordance with claim 1, wherein said fluoroelastomer is selected from the group consisting of a) copolymers of two of vinylidene fluoride, hexafluoropropylene, and tetrafluoroethylene, b) terpolymers of vinylidene fluoride hexafluoropropylene, and tetrafluoroethylene, and c) tetrapolymers of vinylidene fluoride, hexafluoropropylene, tetrafluoroethylene, and a cure site monomer.

12. A process in accordance with claim 11, wherein said fluoroelastomer comprises about 35 weight percent of vinylidenefluoride, about 34 weight percent of hexafluoropropylene, about 29 weight percent of tetrafluoroethylene, and about 2 weight percent of a cure site monomer.

13. A process in accordance with claim 1, wherein said coating solution is applied to said fuser member using a process selected from the group consisting of a) a flow coating process, b) a spray coating process, and c) a dip coating process.

14. A process in accordance with claim 1, wherein said coating solution is applied to said fuser member in an amount to provide a thickness of from about 10 to about 500 micrometers.

15. A process in accordance with claim 1, wherein said fluorine-containing polysiloxane additive is present in said coating solution in an amount of from about 0.5 to about 20 pph based on an amount of fluoroelastomer.

16. A process in accordance with claim 1, wherein said deflocculant is present in said coating solution in an amount of from about 0.5 to about 20 pph based on an amount of fluoroelastomer.

17. A process for producing a fuser member coating comprising:
  a) adding and reacting a fluoroelastomer, a crosslinking agent, a polar solvent, a fluorine-containing polysiloxane additive, and a deflocculant to form a coating solution, and
  b) providing said coating solution on said fuser member to form a fuser member coating, wherein said fluorine-containing polysiloxane additive comprises pendant fluorinated groups, wherein the fluorine-containing polysiloxane additive has the following Formula I:

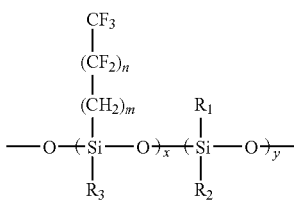

wherein m and n represent the number of repeating units and are the same or different, and wherein m is a number of from about 0 to about 25; n is a number of from about 1 to about 25; $x/(x+y)$ is from about 1 percent to about 100 percent; $R_1$ and $R_2$ can be the same or different and are selected from the group consisting of alkyl having from about 1 to about 18 carbon atoms, arylalkyl groups having from about 1 to about 18 carbons, amino groups, and alkylamino groups having from about 1 to about 18 carbons; and $R_3$ is selected from the group consisting of alkyl having from about 1 to about 18 carbons, arylalkyl having from about 1 to about 18 carbons, a polyorganosiloxane chain having from about 1 to about 300 repeat units, and a fluoro-chain of the formula $(CH_2)_o$—$(CF_2)_p$—$CF_3$ wherein o and p represent the number of repeating units and are the same or different, and wherein o is a number of from about 0 to about 25, and p is a number of from about 0 to about 25.

18. A process for producing a fuser member coating comprising a) adding and reacting a fluoroelastomer, a crosslinking agent, a polar solvent, a fluorine-containing polysiloxane additive, and a deflocculant to form a coating solution, and b) providing said coating solution on said fuser member to form a fuser member coating, wherein said fluorine-containing polysiloxane additive comprises pendant fluorinated groups, wherein said fluoroelastomer is selected from the group consisting of a) copolymers of two of vinylidene fluoride, hexafluoropropylene and tetrafluoroethylene, b) terpolymers of vinylidene fluoride, hexafluoropropylene, and tetrafluoroethylene, and c) tetrapolymers of vinylidene fluoride, hexafluoropropylene, tetrafluoroethylene, and a cure site monomer, and further wherein the fluorine-containing polysiloxane additive has the following Formula I:

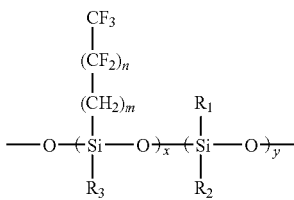

wherein m and n represent the number of repeating units and are the same or different, and wherein m is a number of from about 0 to about 25; n is a number of from about 1 to about 25; $x/(x+y)$ is from about 1 percent to about 100 percent; $R_1$ and $R_2$ can be the same or different and are selected from the group consisting of alkyl having from about 1 to about 18 carbon atoms, arylalkyl groups having from about 1 to about 18 carbons, amino groups, and alkylamino groups having from about 1 to about 18 carbons; and $R_3$ is selected from the group consisting of alkyl having from about 1 to about 18 carbons, arylalkyl having from about 1 to about 18 carbons, a polyorganosiloxane chain having from about 1 to about 300 repeat units, and a fluoro-chain of the formula —$(CH_2)_o$—$(CF_2)_p$—$CF_3$ wherein o and p represent the number of repeating units and are the same or different, and wherein o is a number of from about 0 to about 25, and p is a number of from about 0 to about 25.

19. A process for producing a fuser member coating comprising:
  a) adding and reacting a fluoroelastomer, a crosslinking agent, a polar solvent, and a fluorine-containing polysiloxane additive, and a deflocculant in order to form a coating solution,
  wherein said fluorine-containing polysiloxane additive comprises pendant fluorinated groups,
  wherein said fluorine-containing polysiloxane additive has the following Formula I:

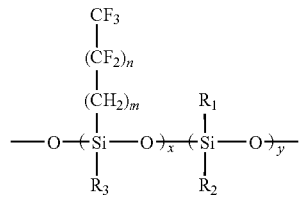

wherein m and n represent the number of repeating units and are the same or different, and wherein m is a number of from about 0 to about 25; n is a number of from about 1 to about 25; $x/(x+y)$ is from about 1 percent to about 100 percent; $R_1$ and $R_2$ can be the same or different and are selected from the group consisting of alkyl having from about 1 to about 18 carbon atoms, arylalkyl groups having from about 1 to about 18 carbons, amino groups, and alkylamino groups having from about 1 to about 18 carbons; and $R_3$ is selected from the group consisting of alkyl having from about 1 to about 18 carbons, arylalkyl having from about 1 to about 18 carbons, a polyorganosiloxane chain having from about 1 to about 300 repeat units, and a fluoro-chain of the formula —$(CH_2)_o$—$(CF_2)_p$—$CF_3$ wherein o and p represent the number of repeating units and are the same or different, and wherein o is a number of from about 0 to about 25, and p is a number of from about 0 to about 25; and
  wherein said deflocculant comprises a material selected from the group consisting of sodium carbonate, sodium silicate, sodium borate, tetrasodium pyrophosphate, polyisobutylene, polyvinyl butyral, polyethylene glycol, glycerol tristearate, corn oil, linseed oil, stearic acid, lanolin fatty acids, fish oils, dibutyl amine, polycaprolactone, aromatic polyisocyanurate, tolyl diisocyanate, and combinations thereof; and
  b) providing said coating solution on said fuser member to form a fuser member coating.

* * * * *